(12) United States Patent
Shiotani

(10) Patent No.: US 10,606,533 B2
(45) Date of Patent: Mar. 31, 2020

(54) EDITING AN IMAGE ON A MEDIUM USING A TEMPLATE INCLUDING ATTRIBUTE INFORMATION OF AN OBJECT IN THE IMAGE

(71) Applicant: Brother Kogyo Kabushiki Kaisha, Nagoya-shi, Aichi-ken (JP)

(72) Inventor: Takeshi Shiotani, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 0 days.

(21) Appl. No.: 15/934,411

(22) Filed: Mar. 23, 2018

(65) Prior Publication Data
US 2019/0073350 A1 Mar. 7, 2019

(30) Foreign Application Priority Data
Sep. 5, 2017 (JP) .................. 2017-170436

(51) Int. Cl.
| | | |
|---|---|---|
| *G06F 15/00* | (2006.01) | |
| *G06K 15/00* | (2006.01) | |
| *G06K 1/00* | (2006.01) | |
| *G06F 3/12* | (2006.01) | |
| *G06F 17/24* | (2006.01) | |
| *G06F 17/21* | (2006.01) | |

(52) U.S. Cl.
CPC .......... *G06F 3/1243* (2013.01); *G06F 3/1208* (2013.01); *G06F 3/1257* (2013.01); *G06F 17/212* (2013.01); *G06F 17/248* (2013.01)

(58) Field of Classification Search
CPC .... G06F 3/1243; G06F 17/248; G06F 3/1208; G06F 3/1257; G06F 17/212

USPC .............. 358/1.18, 1.13, 1.14, 1.1
See application file for complete search history.

(56) References Cited

U.S. PATENT DOCUMENTS

| | | | |
|---|---|---|---|
| 5,930,811 A | 7/1999 | Nojima et al. | |
| 2004/0243930 A1* | 12/2004 | Schowtka | G06F 17/248 715/243 |
| 2005/0195436 A1 | 9/2005 | Tanaka et al. | |
| 2009/0319468 A1* | 12/2009 | Miyata | G06F 21/608 |

(Continued)

FOREIGN PATENT DOCUMENTS

| | | |
|---|---|---|
| JP | H09-128391 A | 5/1997 |
| JP | 2005-250944 A | 9/2005 |

*Primary Examiner* — Douglas Q Tran
(74) *Attorney, Agent, or Firm* — Banner & Witcoff, Ltd.

(57) ABSTRACT

A non-transitory computer-readable medium storing a computer program readable by a computer comprising a display, an interface and a memory. The memory stores a plurality of templates including attribute information of objects to be arranged in each of the plurality of templates, the attribute information including identification information, arrangement information, and type information. The computer program, when executed by the computer, causes the computer to perform: displaying a first editing screen corresponding to a first template; receiving input data; storing the received input data; updating the first editing screen to reflect the received input data; receiving an instruction to display a second editing screen corresponding to a second template; determining the type of the received input data; and displaying a second editing screen with or without reflecting the received input data depending on the type of the object.

15 Claims, 12 Drawing Sheets

(56) References Cited

U.S. PATENT DOCUMENTS

2010/0328714 A1\* 12/2010 Allen .................. G06F 3/04847
　　　　　　　　　　　　　　　　　　　　　　　358/1.15

\* cited by examiner

TEMPLATE INFORMATION

TEMPLATE TABLE 67

| TEMPLATE | SERIES ID | BACKGROUND SCREEN DATA |
|---|---|---|
| 1 | 001 | i1 |
| 2 | 001 | i2 |
| 3 | 002 | i3 |

TEMPLATE 1 T1

| LABEL | TYPE | SIZE | ARRANGEMENT COORDINATE | |
|---|---|---|---|---|
| LOGO | IMAGE | sx11Xsy11 | xx11,yy11 | O11 |
| FACE PHOTOGRAPH | IMAGE | sx12Xsy12 | xx12,yy12 | O12 |
| COMPANY NAME | TEXT | − | xx13,yy13 | O13 |
| POSITION TITLE | TEXT | − | xx14,yy14 | O14 |
| NAME | TEXT | − | xx15,yy15 | O15 |
| OTHERS | TEXT | − | xx16,yy16 | O16 |

FIG. 2B

TEMPLATE 2 — T2

| LABEL | TYPE | SIZE | ARRANGEMENT COORDINATE | |
|---|---|---|---|---|
| LOGO | IMAGE | sx11Xsy11 | xx11,yy11 | O11 |
| FACE PHOTOGRAPH | IMAGE | sx12Xsy12 | xx12,yy12 | O12 |
| COMPANY NAME | TEXT | – | xx13,yy13 | O13 |
| POSITION TITLE | TEXT | – | xx14,yy14 | O14 |
| NAME | TEXT | – | xx15,yy15 | O15 |
| OTHERS | TEXT | – | xx16,yy16 | O16 |

TEMPLATE 3 — T3

| LABEL | TYPE | SIZE | ARRANGEMENT COORDINATE | |
|---|---|---|---|---|
| LOGO | IMAGE | sx21Xsy21 | xx21,yy21 | O21 |
| FACE PHOTOGRAPH | IMAGE | sx12Xsy12 | xx22,yy22 | O22 |
| COMPANY NAME | TEXT | – | xx13,yy13 | O23 |
| POSITION TITLE | TEXT | – | xx14,yy14 | O24 |
| NAME | TEXT | – | xx25,yy25 | O25 |
| OTHERS | TEXT | – | xx26,yy26 | O26 |

FIG. 4

INPUT INFORMATION TABLE
⎯ 68

| LABEL | TYPE | CHARACTER |
|---|---|---|
| COMPANY NAME | TEXT | A CORPORATION |
| POSITION TITLE | TEXT | MANAGER |
| NAME | TEXT | HORITA TARO |
| OTHERS | TEXT | 〒123－・・・・ |

FIG. 9

INPUT INFORMATION TABLE

| SERIES ID | 001 | | | | | |
|---|---|---|---|---|---|---|
| LABEL | TYPE | CHARACTER | COLOR | IMAGE DATA | ARRANGEMENT COORDINATE | SIZE |
| LOGO | IMAGE | — | — | xxx | — | sx11 × sy11 |
| FACE PHOTO-GRAPH | IMAGE | — | — | yyy | — | sx12 × sy12 |
| COMPANY NAME | TEXT | A CORPORATION | — | — | — | — |
| POSITION TITLE | TEXT | MANAGER | — | — | — | — |
| NAME | TEXT | HORITA TARO | — | — | — | — |
| OTHERS | TEXT | 〒123-・・・・ | — | — | xx1, yy1 | — |
| — | IMAGE | | BLUE | zzz | xx2, yy2 | — |
| — | TEXT | DO NOT HESITATE TO CALL ME! | | | | sx32 × sy32 |

68

EDITING AN IMAGE ON A MEDIUM USING A TEMPLATE INCLUDING ATTRIBUTE INFORMATION OF AN OBJECT IN THE IMAGE

CROSS-REFERENCE TO RELATED APPLICATION

This application claims priority from Japanese Patent Application No. 2017-170436 filed on Sep. 5, 2017, the entire subject-matter of which is incorporated herein by reference.

TECHNICAL FIELD

The present disclosure relates to a non-transitory computer-readable medium storing a data processing program, a data processing device, and a data processing method.

BACKGROUND

There has been proposed a related art in which, when preparing print data, which is to be printed on a label, a postcard and the like, by using templates, if a user wants to change a layout after completing input of input data such as a text by using a selected template, the user should select a different template and again input the input data such as a text. In this regard, there has been disclosed a print image editing device in which print images based on a template are displayed in a plurality of displays, and when data of an object is inputted, all the displayed print images are updated to print images on which the inputted data is reflected.

SUMMARY

Illustrative aspects of the disclosure provide a technology of, when changing a template being edited, enabling a template after change to appropriately take over input data inputted by a template before change.

According to one illustrative aspect of the disclosure, there may be provided a non-transitory computer-readable medium storing a computer program readable by a computer comprising a display, an interface and a memory, the memory storing a plurality of templates, the plurality of templates comprising attribute information of objects to be arranged in each of the plurality of templates, the attribute information comprising: identification information identifying the objects; arrangement information indicating arrangement positions of the objects; and type information indicating types of the objects, the type information comprising information indicating whether a type of the object is a first type or a second type, the first type comprising a text, the second type comprising an image, the computer program, when executed by the computer, causing the computer to perform: displaying, on the display, a first editing screen corresponding to a first template of the plurality of templates stored in the memory; receiving input data via the interface; in response to receiving the input data while the first editing screen is displayed on the display, storing the received input in the memory as input data of the object included in the first template; updating the first editing screen to reflect the received input data at a first position, the first position corresponding to an arrangement position indicated by the arrangement information of the object included in the first template; receiving an instruction to display a second editing screen corresponding to a second template via the interface while the first editing screen is displayed on the display, the second template being different from the first template; determining the type of the received input data; displaying, on the display, in response to receiving the instruction, the second editing screen with reflecting the received input data being determined to the first type object stored in the memory and not reflecting the received input data determined to the second type object stored in the memory, the received input data being determined to the first type object being reflected on the second editing screen at a second position as input data of the object included in the second template having the same identification information as the identification information of the object, the second position corresponding to an arrangement position indicated by the arrangement information of the object of the second template, and the received input data being determined to the second type object being not reflected on the second editing screen at the second position as the input data of the object included in the second template having the same identification information as the identification information of the object.

According to another illustrative aspect of the disclosure, there may be provided a data processing device comprising: a display; an interface; a memory storing an application program and a plurality of templates, the plurality of templates comprising attribute information of objects to be arranged in each of the plurality of templates, the attribute information comprising: identification information identifying the objects; arrangement information indicating arrangement positions of the objects; and type information indicating types of the objects, the type information comprising information indicating whether a type of the object is a first type or a second type, the first type comprising a text, the second type comprising an image; and a controller performed by the application program configured to: display, on the display, a first editing screen corresponding to a first template of the plurality of templates stored in the memory; receive input data via the interface; in response to receiving the input data while the first editing screen is displayed on the display, store the received input data in the memory as input data of the object included in the first template; update the first editing screen to reflect the received input data at a first position, the first position corresponding to an arrangement position indicated by the arrangement information of the object included in the first template; receive an instruction to display a second editing screen corresponding to a second template via the interface while the first editing screen is displayed on the display, the second template being different from the first template; determine the type of the received data; and display, on the display, in response to receiving the instruction, the second editing screen with reflecting the received input data being determined to the first type object stored in the memory and not reflecting the received input data being determined to the second type object stored in the memory, the received input data determined to the first type object being reflected on the second editing screen at a second position as input data of the object included in the second template having the same identification information as the identification information of the object, the second position corresponding to an arrangement position indicated by the arrangement information of the object of the second template, and the received input data being determined the second type object being not reflected on the second editing screen at the second position as the input data of the object included the second template having the same identification information as the identification information of the object.

According to still another illustrative aspect of the disclosure, there may be provided a data processing method of a computer comprising a display, an interface and a memory, the memory storing a plurality of templates, the plurality of templates comprising attribute information of objects to be arranged in each of the plurality of templates, the attribute information comprising: identification information identifying the objects; arrangement information indicating arrangement positions of the objects; and type information indicating types of the objects, the type information comprising information indicating whether a type of the object is a first type or a second type, the first type comprising a text, the second type comprising an image, the data processing method comprising causing the computer to perform: displaying, on the display, a first editing screen corresponding to a first template of the plurality of templates stored in the memory; receiving input data via the interface; in response to receiving the input data while the first editing screen is displayed on the display, storing the received input data in the memory as input data of the object included in the first template; updating the first editing screen to reflect the received input data at a first position, the first position corresponding to an arrangement position indicated by the arrangement information of the object included in the first template; receiving an instruction to display a second editing screen corresponding to a second template via the interface while the first editing screen is displayed on the display, the second template being different from the first template; determining the type of the received input data; and displaying, on the display, in response to receiving the instruction, the second editing screen with reflecting the received input data being determined to the first type object stored in the memory and not reflecting the received input data determined to the second type object stored in the memory, the received input data being determined to the first type object being reflected on the second editing screen at a second position as input data of the object included in the second template having the same identification information as the identification information of the object, the second position corresponding to an arrangement position indicated by the arrangement information of the object of the second template, and the received input data being determined to the second type object being not reflected on the second editing screen at the second position as the second input data of the object included in the second template having the same identification information as the identification information of the object.

According to the present disclosure, it is possible to provide the technology capable of, when editing the template being edited, enabling the template after change to appropriately take over the input data inputted by the template before change.

BRIEF DESCRIPTION OF THE DRAWINGS

FIGS. 2A and 2B illustrate template information;

FIG. 4 illustrates an input information table in accordance with the first illustrative embodiment;

FIG. 9 illustrates an input information table in accordance with a second illustrative embodiment;

DETAILED DESCRIPTION

Figure 1:
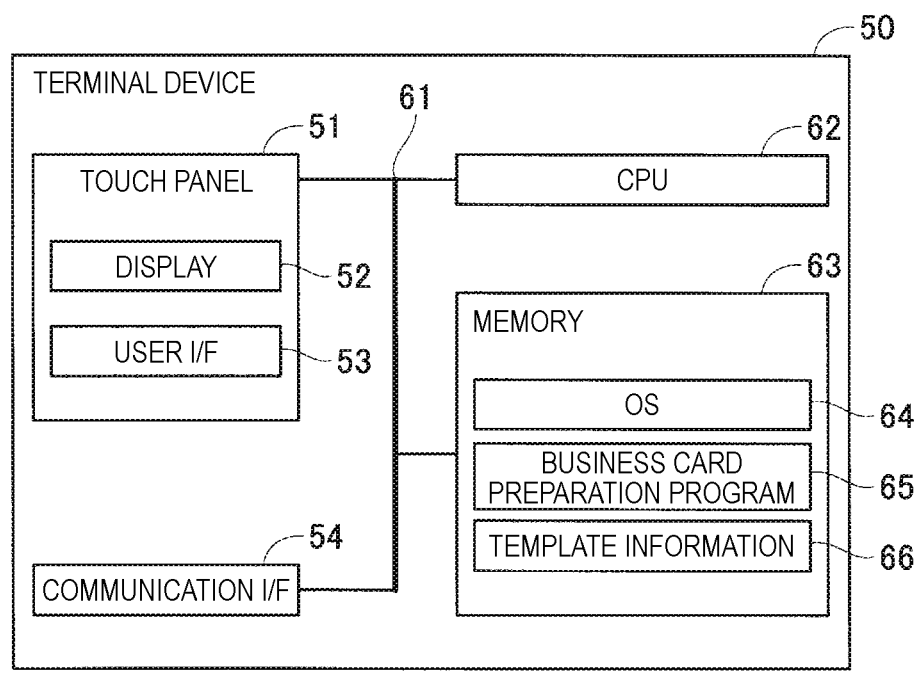
FIG. 1 is a block diagram of a system in accordance with a first illustrative embodiment.

First Illustrative Embodiment (Configuration of Portable Device)

A portable device 50 is a smart phone, a tablet, a portable phone or the like, for example. The portable device 50 includes a touch panel 51, a communication I/F 54, a CPU 62, a memory 63, and the like. The touch panel 51 includes a display 52 and a user I/F 53. The display 52 is implemented by an LCD, an organic display, or the like, for example. The user I/F 53 is implemented by a touch sensor, or the like, for example. The touch panel 51 is configured to display information on the display 52, and to output a user's operation on the display 52 to the CPU 62, as position information on the display 52.

The communication I/F 54 is configured to perform communication through a communication network. The memory 63 is implemented by a RAM, a ROM, an EEPROM, a portable storage medium such as a USB memory to be detachably mounted to the portable device 50, a buffer of the CPU 62 or a combination thereof, for example. Meanwhile, in the below, a non-volatile memory such as an EEPROM may be referred to as a storage area of the memory 63. The memory 63 has an OS 64, a business card preparation program 65, template information 66 and the like stored therein. The CPU 62 is configured to read out and execute diverse programs from the memory 63. The OS 64 may be Android (registered trademark) OS, iOS (registered trademark), Windows Phone (registered trademark) Operating System, or the like. The OS 64 can execute in parallel a plurality of programs installed in the portable device 50. The plurality of programs is executed virtually in parallel by time division multiplexing, for example. Also, the OS 64 executes one of the plurality of programs being executed in parallel at the foreground, and executes the other programs at the background.

The memory 63 may be a computer-readable storage medium. The computer-readable storage medium is a non-transitory medium. The non-transitory medium includes a recording medium such as a CD-ROM and a DVD-ROM as well as the above-described media. Also, the non-transitory medium is a tangible medium. In the meantime, an electric signal for carrying a program to be downloaded from a server or the like on Internet is a computer-readable signal medium, which is a kind of the computer-readable medium, but is not included in the non-transitory computer-readable storage medium.

(Business Card Preparation Program)

The business card preparation program 65 is an application program for editing an image of a business card by using a template. The template is information including attribute information of an object to be arranged. The template is included in the template information 66.

In the meantime, processing and each processing step of a flowchart to be described later basically indicate processing that is to be executed by the CPU 62 in accordance with commands described in the program such as the business card preparation program 65. That is, in the below, the processing of "determination", "extraction", "selection", "calculation", "decision", "specifying", "obtaining", "receiving", "control" and the like indicates the processing of the CPU 62. The processing that is to be executed by the CPU 62 includes hardware control of using an API of the OS 64, too. In the specification, the operations of each program are described while omitting the description of the OS 64. That is, in the below, the description "program B is configured to control hardware C" may indicate that "program B is configured to control hardware C by using the API of the OS 64". In the meantime, "obtaining" is used as a concept that does not necessarily require a request. That is, processing of receiving data without a request of the CPU 62 is also included in a concept "CPU 62 obtains data". Also, in the specification, "data" is expressed by a bit string that can be read by a computer. The data having substantially the same meaning and the different formats is handled as the same data. This also applies to the "information" of the specification.

Figure 5:
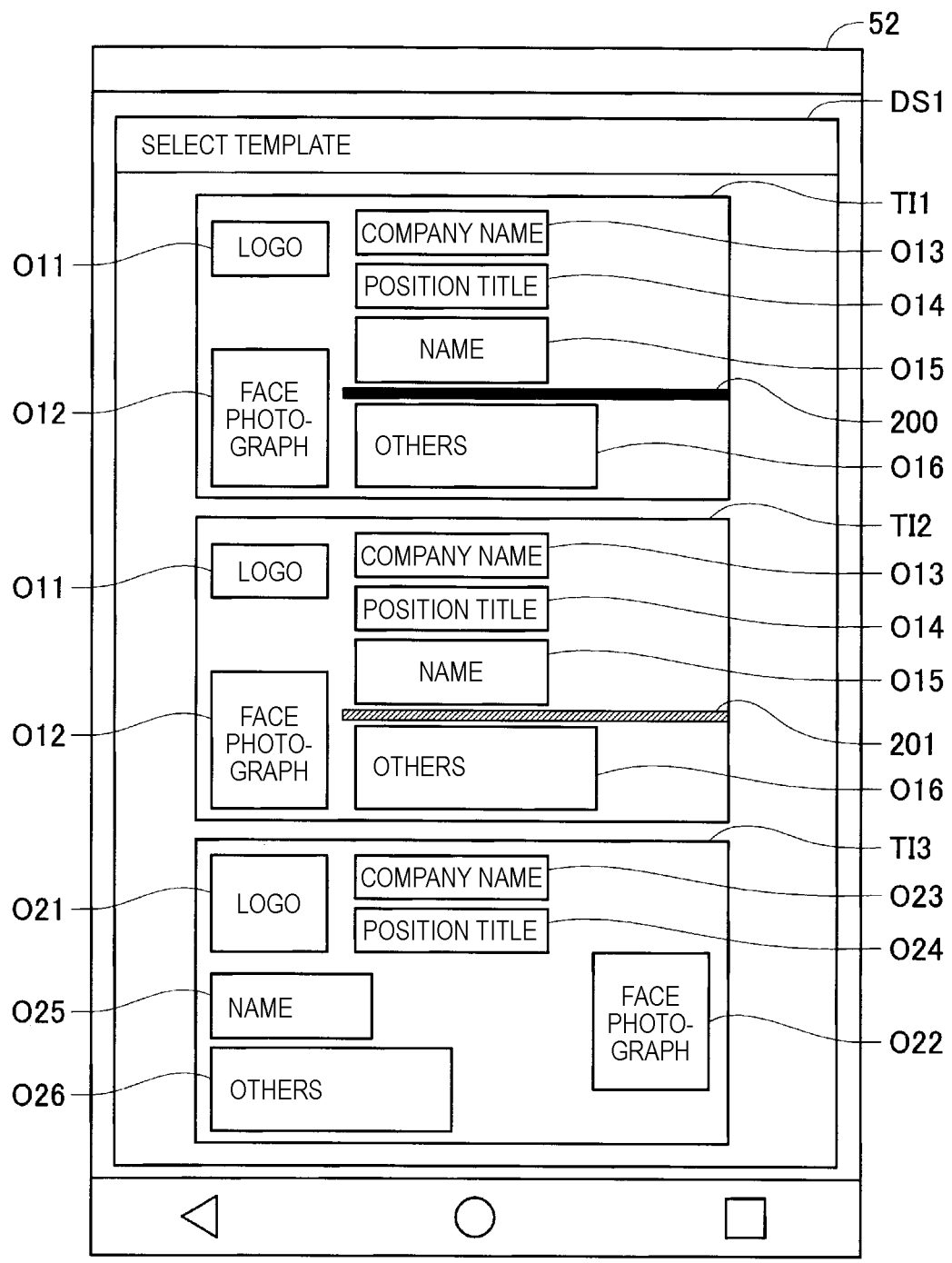
FIG. 5 depicts a template selection screen in accordance with the first illustrative embodiment.

First, the template information 66 is described with reference to FIGS. 2A and 2B. Here, it is assumed that three templates are included in the template information 66. Each template is given with a number. In the below, when distinguishing the three templates, they are described as templates T1 to T3, and otherwise, they are collectively described as the template T. In the meantime, images that are to be displayed on the display 52 on the basis of the templates T1 to T3 are template images TI1 to TI3 as shown in FIG. 5, for example. In the below, when distinguishing the template images, they are described as template images TI1 to TI3, and otherwise, they are collectively described as the template image TI.

The template information 66 includes a template table 67 and templates T1 to T3. The template table 67 is a table in which attributes of "template", "series ID" and "background image data" are configured as one set. "Template" is an attribute for identifying each template T. A value of "template" and a number given to the template T are associated with each other. For example, a row of which "template" of the template table 67 is "1" and a template T1 are associated with each other. Each of the templates T is classified to any one of multiple groups, and an attribute for identifying a group is "series ID". "Background image data" is an attribute indicative of background image data itself or a location of background image data.

The template T is data in which attributes of "label", "type", "size" and "arrangement coordinate" are configured as one set. One row corresponds to one object. The object is one lump of data to be processed, and is displayed as one image, a series of character strings, or the like, in the template images TI1 to TI3. Here, data and image are described as the object with no distinction. For example, in the template image shown in FIG. 5, six objects, i.e., objects O11 to O16 are included. In the below, when distinguishing the respective objects, a number is denoted after the object O, and otherwise, the objects are simply described as the object O.

Returning to FIGS. 2A and 2B, "label" is an attribute for identifying the object O, and has values of "logo", "face photograph", "company name", "position title", "name", "others", and the like, for example. "Type" is an attribute indicative of a type of the object O, and has values of "image", "text" and the like, for example. In the meantime, here, "image" is a concept including a figure except a text, irrespective of a data format such as a vector format, a raster format and the like. This is also the same in the below. "size" is an attribute indicative of an area size when the object O is arranged in the template image TI. "Arrangement coordinate" is an attribute indicative of an arrangement position, which is indicated by an XY coordinate system having a reference position of the template image TI as an origin when the object O is arranged in the template image T1. In the meantime, although not shown in FIGS. 2A and 2B, the attributes of the template T further include attributes of a font, a color, a font size and the like of a text, for example.

The templates T in which all the included objects O coincide with each other with respect to the attributes, including the values of the attributes shown in FIGS. 2A and 2B, are classified into the same group. For example, the template T1 and the template T2 include the objects O11 to O16 having the same values of attributes, and the values of "series ID" thereof are "001". The template T1 and the template T2 have different values of "background image data". As shown in FIG. 5, the arrangement positions of the objects O11 to O16 included in the template images TI1, TI2 are the same, and a figure included in the background image is a black FIG. 200 in the template image TI1 and is an obliquely hatched figure 201 in the template image TI2.

In the meantime, here, as shown in FIGS. 2A and 2B, the objects O11 to O16 included in the templates T1, T2 and the objects O21 to O26 included in the template T3 have the same values of "label" and "type" and have different values of "arrangement coordinate". Also, the object O11 and the object O21 have different values of "size", and the object O12 and the object O22 have the same value of "size". In the first illustrative embodiment, the templates T having the same values of "label" and "type" are described. However, for example, an object O having the attribute "type", which is included in the template T1 but is not included in the template T3, may be provided.

Figure 3:
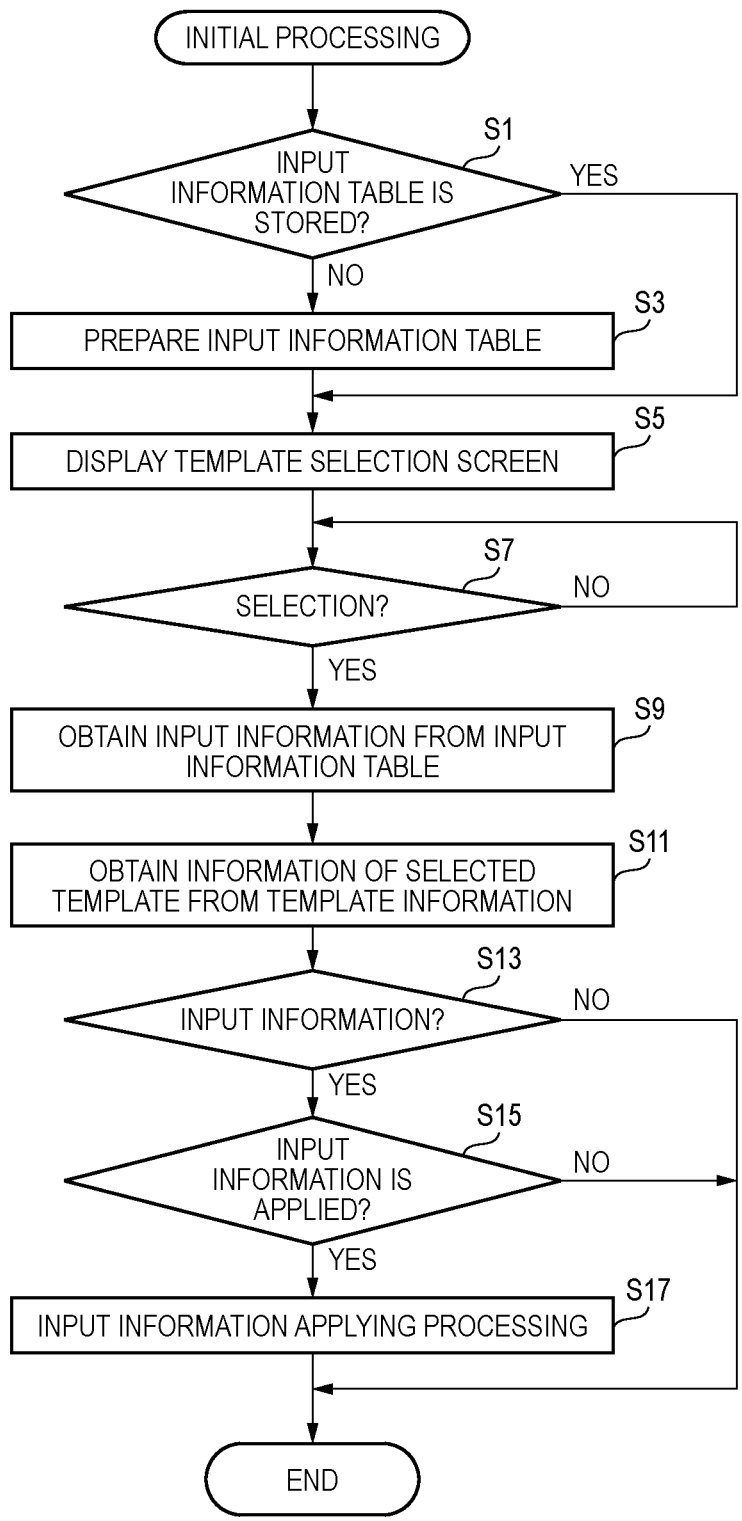
FIG. 3 is a flowchart of initial processing in accordance with the first illustrative embodiment.

A user operates the touch panel 51 to instruct activation of the business card preparation program 65 in the portable device 50. When the instruction to activate the business card preparation program 65 is received through the user I/F 53, the CPU 62 activates the business card preparation program 65. The activated business card preparation program 65 starts initial processing shown in FIG. 3. First, the business card preparation program 65 determines whether an input information table 68 (FIG. 4) is stored in a storage area of the memory 63 (S1). In the meantime, when the CPU 62 executes the business card preparation program 65 for the first time, the business card preparation program 65 determines NO in step S1 because the input information table 68 has not been stored in the storage area of the memory 63. When it is determined that the input information table 68 is not stored in the storage area of the memory 63 (S1: NO), the business card preparation program 65 prepares an input information table 68, stores the prepared input information table 68 in the storage area of the memory 63 (S3), and proceeds to step S5. On the other hand, when it is determined that the input information table 68 is stored in the storage area of the memory 63 (S1: YES), the business card preparation program 65 skips over step S3, and proceeds to step S5.

Figure 6A:
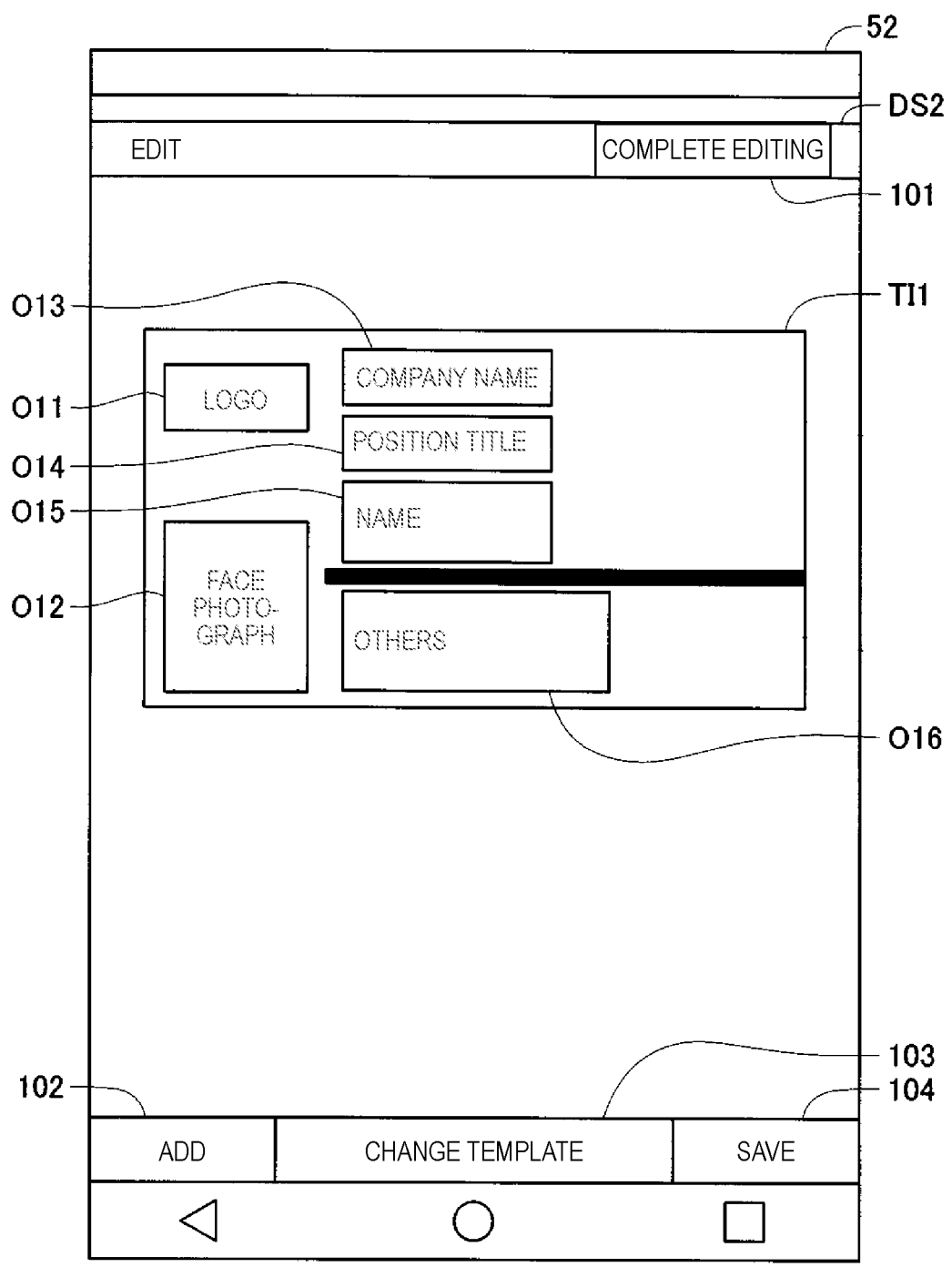
FIGS. 6A and 6B depict editing screens in accordance with the first illustrative embodiment.
Figure 6B:
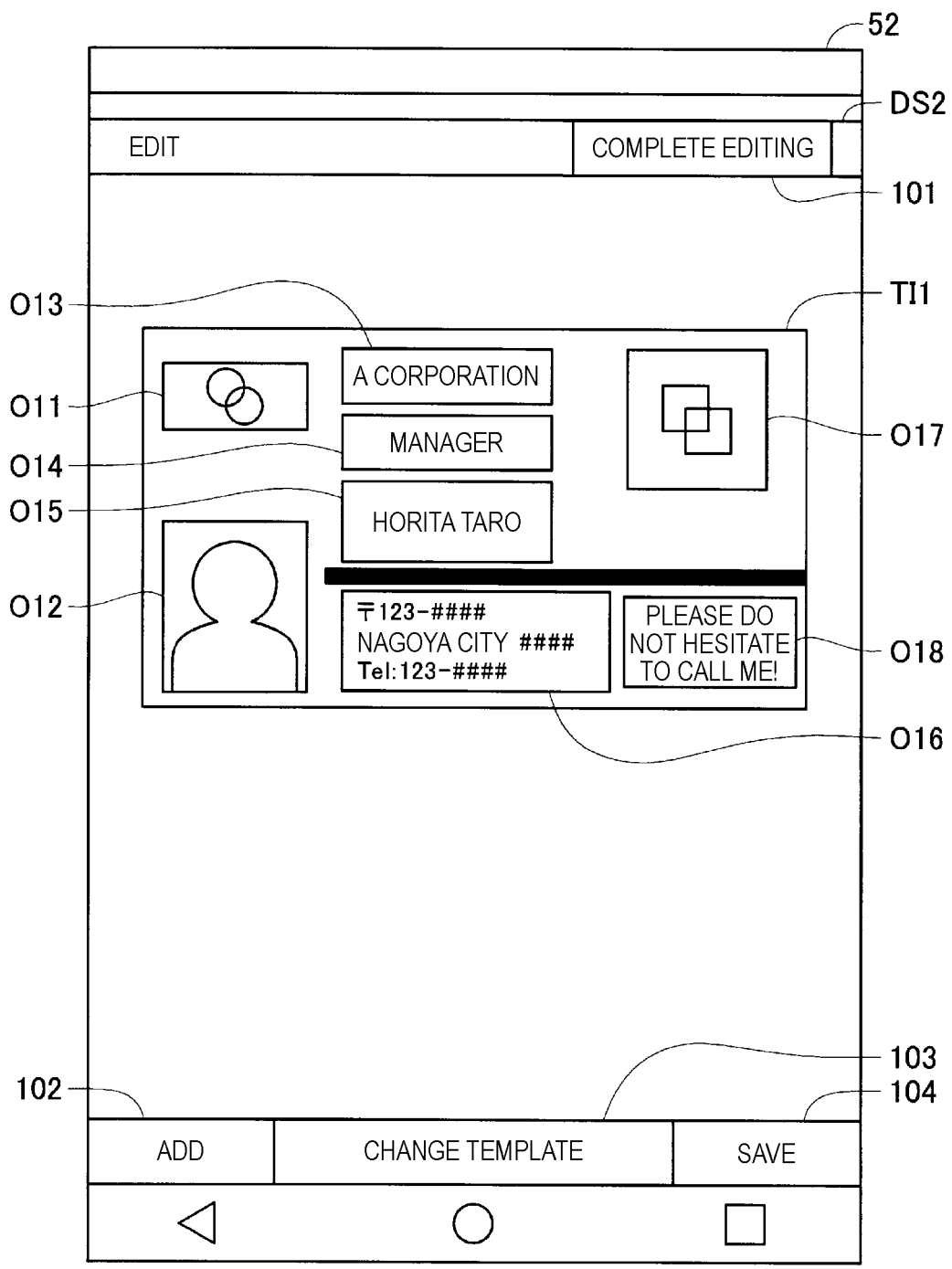

Here, the input information table 68 is described with reference to FIG. 4. The input information table 68 is a table for storing the received input data in association with the objects O. The input data is data that is to be displayed in the template image TI. Specifically, as shown in FIGS. 6A and 6B, in the case of the object O of which "type" is a text, the input data is a character string such as "A Corporation", for example. Also, in the case of the object O of which "type" is an image, the input data is an image data such as a face photograph, for example. In the meantime, in the case of the object O of which "type" is an image, the input data that is to be stored in the input information table 68 may be information indicative of a location of image data, instead of the image data itself, as described later in a second illustrative embodiment. The input information table 68 is data having attributes of "label", "type", "character" and the like. "Label", "type" and "character" are configured as one set, which corresponds to one object O, Since "label" and "type" are the same as the template T, the descriptions thereof are omitted. The value of "character" indicates the input data of the object O of which "type" is a text. Meanwhile, in FIG. 4, the input information table 68 in which values are input is exemplified. However, in step S3, the input information table 68 in which values of the respective attributes are empty is prepared.

Returning to FIG. 3, the business card preparation program 65 displays a template selection screen DS1 shown in FIG. 5 (S5). In the template selection screen DS1, template images TI1 to TI3 corresponding to the templates T1 to T3 stored in the memory 63 are displayed. Meanwhile, in FIG. 5, for descriptions, the input data of the objects O is shown as being its own values of "label". However, for example, the input data of a sample may be displayed. The user taps one of the templates T1 to T3 for selection. Meanwhile, in the below, the configuration "tap for selection" may also be simply described as "select". Then, the business card preparation program 65 determines whether the selection operation on any one of the template images TI1 to TI3 displayed in the template selection screen DS1 is received (S7). When it is determined that the selection operation is not received (S7: NO), the business card preparation program 65 repetitively executes the processing of step S7 until it is determined that the selection operation is received. When it is determined that the selection operation is received (S7: YES), the business card preparation program 65 obtains input information from the input information table 68 (S9). The input information is each value of the input information table 68. Specifically, in step S9, the business card preparation program 65 reads out the input information from the storage area of the memory 63, and stores the input information in the RAM of the memory 63. In the meantime, when the initial processing is executed for the first time, since the input information is empty, a value such as Null value indicative of the empty is read out as the input information, for example.

Then, the business card preparation program 65 obtains information about a selected template, which is the selected template T for which it is determined that the selection operation is received in the template selection screen DS1, from the template information 66 (S11). Specifically, the business card preparation program 65 searches the template table 67 and the templates T of the template information 66 stored in the memory 63 for a row and a template T, which coincide with a number of the selected template, reads out the corresponding row and each value of the template T, and stores the same in the RAM of the memory 63. Then, the business card preparation program 65 determines whether there is the input information obtained in S9 (S13). When at least one value of the input information is not the value indicative of the empty, the business card preparation program 65 determines that there is the input information, and when the input information is all the values indicative of the empty, the business card preparation program 65 determines that there is no input information. When it is determined that there is no input information (S13: NO), the business card preparation program 65 ends the initial processing. On the other hand, when it is determined that there is the input information (S13: YES), the business card preparation program 65 displays, on the display 52, a message such as "Do you want the previous information to be reflected?", for example, and selection buttons of "Yes" and "No". The user selects the selection button "Yes" or "No". Then, the business card preparation program 65 determines whether or not to apply the input information (S15). When a selection operation on the selection button "Yes" is received through the user I/F 53, the business card preparation program 65 determines that the input information is to be applied, and when a selection operation on the selection button "No" is received through the user I/F 53, the business card preparation program 65 determines that the input information is not to be applied. When it is determined that the input information is not to be applied (S15: NO), the business card preparation program 65 ends the initial processing. On the other hand, when it is determined that the input information is to be applied (S15: YES), the business card preparation program 65 executes input information applying processing (S17), and ends the initial processing. The input information applying processing will be described later.

When the initial processing is over, the business card preparation program 65 displays an editing screen DS2 including the template image TI, which is shown in FIGS. 6A and 6B. FIG. 6A shows an example of the editing screen DS2 including the template image T1 when there is no input information, and FIG. 6B shows an example of the editing screen DS2 including the template image T1 when there is the input information. Specifically, the business card preparation program 65 displays, on the display 52, the editing screen DS2 including the image of the template T stored in the RAM of the memory 63. In the meantime, as described later, when the processing of step S17 is executed and the initial processing is then over, since the input data is associated with the template T stored in the RAM of the memory 63, the editing screen DS2 including the template image TI having the input data reflected therein is displayed. On the other hand, when a result of the determination in step S13 is NO and the initial processing is then over, since the input data is not associated with the template T stored in the RAM of the memory 63, the editing screen DS2 including the template image TI, in which the input data is not reflected, is displayed.

In the meantime, the editing screen DS2 shown in FIG. 6B exemplifies an editing screen that is displayed after the template T1 is selected in the template selection screen DS1 and the user inputs the input data to the editing screen DS2 shown in FIG. 6A. In the editing screen DS2, a template image TI1, an editing completion button 101, an addition button 102, a template change button 103, and a save button 104 are displayed. When "type" of the object O is a text, the business card preparation program 65 displays a text box and receives input data, in response to the selection operation of the object O being received through the user I/F 53. Here, since the attributes of a font, a color and the like are stored for each of the templates, the user inputs only a character string through the user I/F 53. Here, objects O13 to O16 shown in FIG. 6B are objects O after receiving user's selection operation and input data through the user I/F 53 on the editing screen DS2 shown in FIG. 6A. When "type" of the object O is an image, the business card preparation program 65 displays a widget for receiving information of specifying image data, such as a path name, and receives input data, in response to the selection operation of the object O being received through the user I/F 53. Here, objects O11 and O12 shown in FIG. 6B are objects O after receiving user's selection operation and input data through the user I/F 53 on the editing screen DS2 shown in FIG. 6A. The addition button 102 is a button for receiving an input of an object O that is not in the template T. The user selects the addition button 102, and then taps a desired arrangement position in the template image TI1. When a tap operation on an area in the template image TI1 is received through the user I/F 53 after the selection operation on the addition button 102 is received through the user I/F 53, the business card preparation program 65 receives a value of each attribute of the input information table 68, and displays the object O corresponding to the value at the arrangement position at which the tap operation has been received. In the meantime, in the case of the input data of the object O received by the addition button, when the input data is a text, for example, the attributes of a color, a size and the like are also received from the user through the user I/F 53. Here, objects O17, O18 shown in FIG. 6B are objects O added in correspondence to the user's operation on the addition button 102 on FIG. 6A. "Type" of the object O17 is an image, and "type" of the object O18 is a text.

When a selection operation on the editing completion button 101 is received through the user I/F 53, and when a selection operation on the save button 104 is received through the user I/F 53, the business card preparation program 65 starts save processing. When the save processing starts, the business card preparation program 65 overwrites and stores the input data being displayed in the editing screen DS2 in the input information table 68 (FIG. 4), stores the input information table 68 in the RAM and storage area of the memory 63, and ends the save processing. In the meantime, when the selection operation on the editing completion button 101 is received, the business card preparation program 65 stores the input information table 68, and then shifts to printing preparation processing for printing in accordance with editing contents. When the selection operation on the save button 104 is received, the input information table 68 is stored and the business card preparation program 65 is then over. Specifically, for the object O of the template T of which "type" is a text, the business card preparation program 65 stores the input data as the value of "character", and stores the values of "label" and "type", which are the same as the template T. Meanwhile, in the first illustrative embodiment, the business card preparation program 65 does not store the input data for the object O of the template T of which "type" is an image and the object O inputted as the addition button 102 is selected.

Figure 7:
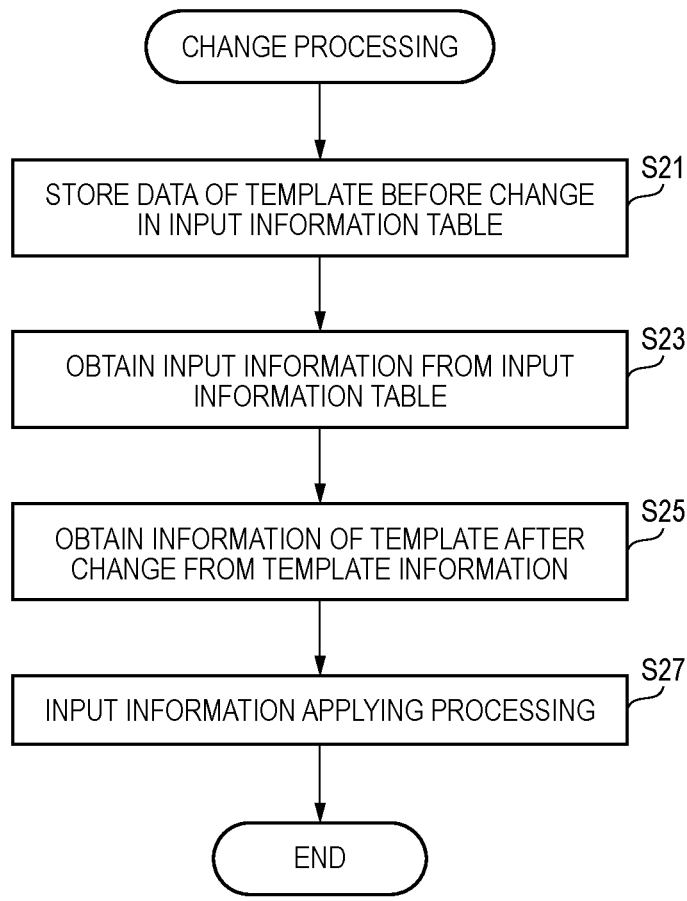
FIG. 7 is a flowchart of change processing in accordance with the first illustrative embodiment.

Returning to FIG. 6A, the template change button 103 is a button for changing a template being edited. When a selection operation on the template change button 103 is received through the user I/F 53, the business card preparation program 65 displays the template selection screen DS1 (FIG. 5), When it is determined that a selection operation on any one of the template images TI1 to TI3 displayed in the template selection screen DS1 is received, the business card preparation program 65 starts change processing shown in FIG. 7. When the change processing starts, the business card preparation program 65 stores the input data displayed in the template before change, which is the template T being displayed in the editing screen DS2, in the input information table 68 (FIG. 4), and stores the input information table 68 in the RAM and storage area of the memory 63 (S21). Since the processing of step S21 is the same as the save processing, the detailed description thereof is omitted. Then, the business card preparation program 65 obtains the input information from the input information table 68 (S23), like the processing of step S9. Then, like the processing of step S11, the business card preparation program 65 obtains the information about the template after change (i.e. the selected template), which is the template T for which it is determined that the selection operation thereof is received on the template selection screen DS1, from the template information 66 (S25). Then, the business card preparation program 65 executes the input information applying processing (S27), and ends the change processing.

When the change processing is over, the business card preparation program 65 displays the editing screen DS2, which includes the image of the template T stored in the RAM of the memory 63, on the display 52 (see FIG. 6B), like the case after the initial processing is over.

In the meantime, the input information applying processing that is executed in step S27 and the input information applying processing that is executed in step S17 are the same. That is, when the user selects the template change button 103 of the editing screen DS2 so as to change the template T, and when the user intends to display the template T in which the previously edited input information is reflected, the input information applying processing is executed.

Subsequently, the input information applying processing is described. When the input information applying processing starts, the business card preparation program 65 determines the input data of the object O, of which "type" of the input information obtained in step S9 or step S23 is a text. The business card preparation program 65 stores the input data determined text type object, in the RAM of the memory 63 in association with the template after change obtained in step S11 or step S25. Specifically, the business card preparation program 65 associates the input data with the object O of the template after change of which the value of "label" is the same.

As described above, after the input information applying processing is executed and the initial processing is then over, and after the input information applying processing is executed and the change processing is then over, the business card preparation program 65 displays, on the display 52, the template after change associated with the input data stored in the RAM of the memory 63. Specifically, the business card preparation program 65 displays, on the display 52, the editing screen in which each object O of the template after change is displayed at a position of the template image TI corresponding to the arrangement position indicated by the value of "arrangement coordinate", at which the input data stored in the memory 63 in association with each object O is reflected in accordance with the attributes of each object O of the template after change.

Figure 8:
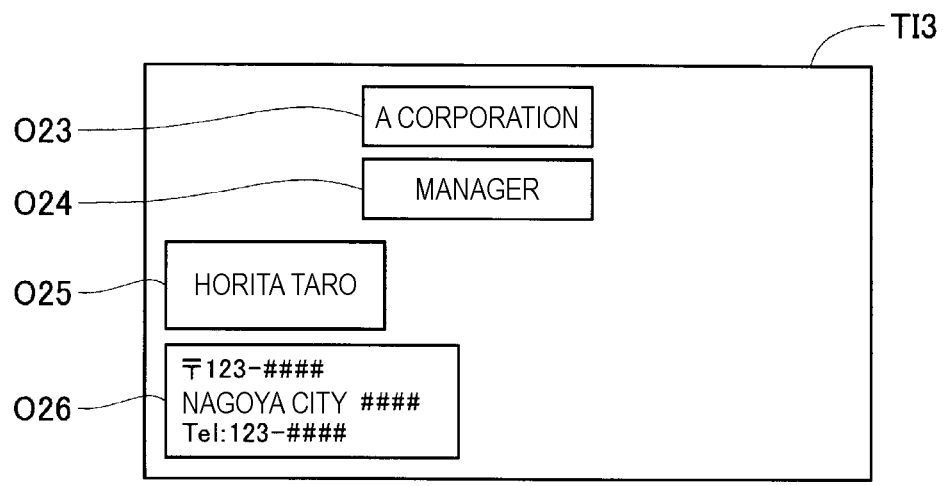
FIG. 8 depicts an image of a template after change in accordance with the first illustrative embodiment.

For example, when the template before change is the template T1 and the template after change is the template T3, the template image TI3 that is displayed on the editing screen is as shown in FIG. 8. As shown in FIGS. 2A and 2B, the objects O, of which "type" is a text and the value of "label" is common to the template T1, of the objects O of the template are objects O23 to O26. Therefore, as shown in FIG. 8, the objects O23 to O26 are displayed in the template image TI3 that is displayed in the editing screen.

Here, the user I/F 53 is an example of the interface, the memory 63 is an example of the storage, and the portable device 50 is an example of the computer and the data processing device. Also, the CPU 62 and the memory 63 are examples of the controller. Also, the business card preparation program 65 is an example of the data processing program.

Also, the template T and the template image TI are examples of the template, and the object O is an example of the object. The value of "label", which is the attribute of the template T, is an example of the identification information, the value of "type" is an example of the type information, and the value of "arrangement coordinate" is an example of the arrangement information. Also, the text, which is the value of "type", is an example of the first type, and the image is an example of the second type. The template before change is an example of the first template, and the template after change is an example of the second template.

Also, the processing in which the business card preparation program 65 displays the editing screen DS2 including the image of the template before change on the display 52 is an example of the display processing. The processing in which the business card preparation program 65 receives the input data, in response to receiving the selection operation on the object O of the template image TI displayed in the editing screen DS2 through the user I/F 53, and in response to receiving the selection operation of the addition button 102 through the user I/F 53, is an example of the first receiving processing. The processing of step S21 is an example of the storing processing. The processing in which the business card preparation program 65 receives the selection operation on the template change button 103 of the editing screen DS2 through the user I/F 53 and receives the selection operation on the template T in the template selection screen DS1, which is different from the template T displayed in the editing screen DS2, through the user I/F 53 is an example of the second receiving processing. The editing screen DS2 exemplified in FIG. 6 and including the template image TI1, which is the template before change in which the input data is reflected, is an example of the first editing screen. The editing screen DS2 exemplified in FIG. 8 and including the template image TI3, which is the template after change in which the input data is reflected, is an example of the second editing screen. The processing to be executed by the business card preparation program 65, in which the editing screen DS2 including the image of the template before change in which the input data is reflected is displayed on the display 52 and the processing to be executed by the business card preparation program 65, in which the editing screen DS2 including the image of the template after change in which the input data is reflected is displayed on the display 52 are examples of the display update processing. Also, the editing screen DS2 including the image of the template after change in which the input data is reflected is an example of the third editing screen. Also, the selection operation on the selection button "Yes", which is displayed on the display 52 when a result of the determination in step S13 is YES, is an example of the predetermined input.

According to the first illustrative embodiment, following effects are accomplished.

When the selection operation on the template change button 103 of the editing screen DS2 is received through the user I/F 53 and the selection operation on the template T in the template selection screen DS1, which is different from the template T displayed in the editing screen DS2, is received through the user I/F 53, the business card preparation program. 65 executes the processing of step S21. In step S21, in the case of the object O, of which "type" is a text, of the objects O of the template before change, the business card preparation program 65 stores the input data of the corresponding object O in the memory 63, as the input data of the object O of the template after change having the same value of "label" as the object O of the template before change. Also, in step S21, in the case of the object O, of which "type" is an image, of the objects O of the template before change, the business card preparation program 65 does not store the input data of the corresponding object O in the memory 63, as the input data of the object O of the template after change having the same value of "label" as the object O of the template before change. The business card preparation program 65 displays, on the display 52, the editing screen DS2 in which the input data stored in the memory 63 as the input data of the object O of the template after change is reflected at the position corresponding to the arrangement position indicated by the value of "arrangement coordinate" of the object O of the template after change. Thereby, the input data, of which "type" is a text, of the input data of the template before change is reflected in the changed template, and the input data, of which "type" is an image, of the input data of the template before change is not reflected in the changed template. In the case where the input data is an image, when a size of the input data in the template image TI and a size of the object O of the template after change are different, the image is edited to have the same size as the object O of the template after change, so that display contents of the image may not be kept. Since the input data of which "type" is an image is not reflected in the changed template, the template after change can appropriately take over the input data of the template before change.

Also, the business card preparation program 65 obtains the input data stored in the memory 63 in step S9 of the initial processing, and stores, in the memory 63, the template associated with the input data in step S17. After the initial processing is over, the business card preparation program 65 displays, on the display 52, the image of the template, which is reflected as the input data of step S9 in the object O of the template, based on the template associated with the input data stored in the memory 63. Thereby, even when the business card preparation program 65 is again activated after the business card preparation program 65 is over, it is possible to display the template in which the previous input data is reflected.

Also, in the case where the result of the determination in step S13 is YES, when the selection operation on the selection button "Yes", which is displayed together with the message "Do you want the previous information to be reflected?", is received through the user I/F 53, the business card preparation program 65 displays, on the display 52, the image of the template in which the input data stored in the memory 63 is reflected in step S17, and when the selection operation on the selection button "Yes" is not received through the user I/F 53, the business card preparation program 65 displays, on the display 52, the image of the template in which the input data is not reflected even though the input data is stored in the memory 63. That is, the template in which the input data is reflected can be displayed only when the user intends to reflect the input data stored in the memory 63.

Second Illustrative Embodiment

The system 1 in accordance with a second illustrative embodiment has the same configuration as the system 1 in accordance with the first illustrative embodiment. The business card preparation program 65 in accordance with the second illustrative embodiment executes the save processing, the processing of step S21 and the input information applying processing of steps S17 and S27 of the processing relating to the first illustrative embodiment, in different processing contents from the first illustrative embodiment, and executes the other processing, in the same processing contents as the first illustrative embodiment.

The processing of step S21 in accordance with the second illustrative embodiment is described. In the meantime, the save processing in accordance with the second illustrative embodiment is the same as the processing that is executed in step S21.

In step S21, the business card preparation program 65 stores the input data being displayed on the editing screen DS2 in the input information table 68, and stores the input information table 68 in the RAM and storage area of the memory 63. The input information table 68 in accordance with the second illustrative embodiment is different from the input information table 68 in accordance with the first illustrative embodiment. Specifically, as shown in FIG. 9, the input information table 68 in accordance with the second illustrative embodiment is data having attributes of "series ID", "label", "type", "character", "color", "image data", "arrangement coordinate", "size" and the like. "label", "type", "character", "color", "image data", "arrangement coordinate" and "size" are configured as one set, which corresponds to one object O. Since "label", "type", "arrangement coordinate" and "size" are the same as the template T, the descriptions thereof are omitted. A value of "character" indicates the input data of the object O of which "type" is a text. A value of "color" indicates a display color when the input data of the object O of which "type" is a text is displayed on the display 52 and a printing color when it is printed on a printing medium. A value of "image data" indicates the input data of the object O of which "type" is a text, and indicates data itself or a location of data. In step S21, for the object O of which "type" is an image and which is in the template information 66, the business card preparation program 65 stores the input data and the size of the input data, as values of "image data" and "size", and stores a value of "label" of the template before change, as a value of "label". Also, for the object O of which "type" is a text and which is in the template information 66, the business card preparation program 65 stores the input data as a value of "character", and stores a value of "label" of the template before change, as a value of "label". Also, for the object O which is not in the template information 66, the business card preparation program 65 sets "label" to an empty state, and stores received values, as the attributes except "label". Also, the business card preparation program 65 stores a value of "series ID", as a value of "series ID" of the template before change.

That is, for the object O in the template information 66, a value of "label" is stored. In the meantime, the objects O of the input information table 68 shown in FIG. 9 correspond to the objects O11 to O18 in corresponding order from above. On the other hand, for the object O that is not in the template information 66, the value of "label" is empty. For the object O, of which "type" is an image, of the input data of the objects O that are not in the template information 66, values of "image data" and "arrangement coordinate" are stored. For the object O, of which "type" is a text, of the objects O that are not in the template information 66, values of "character", "color", "arrangement coordinate" and "size" are stored. Meanwhile, here, a font of the object O, of which "type" is a text, of the input data of the objects O that are not in the template information 66, is determined in correspondence to the value of "size".

Figure 10:
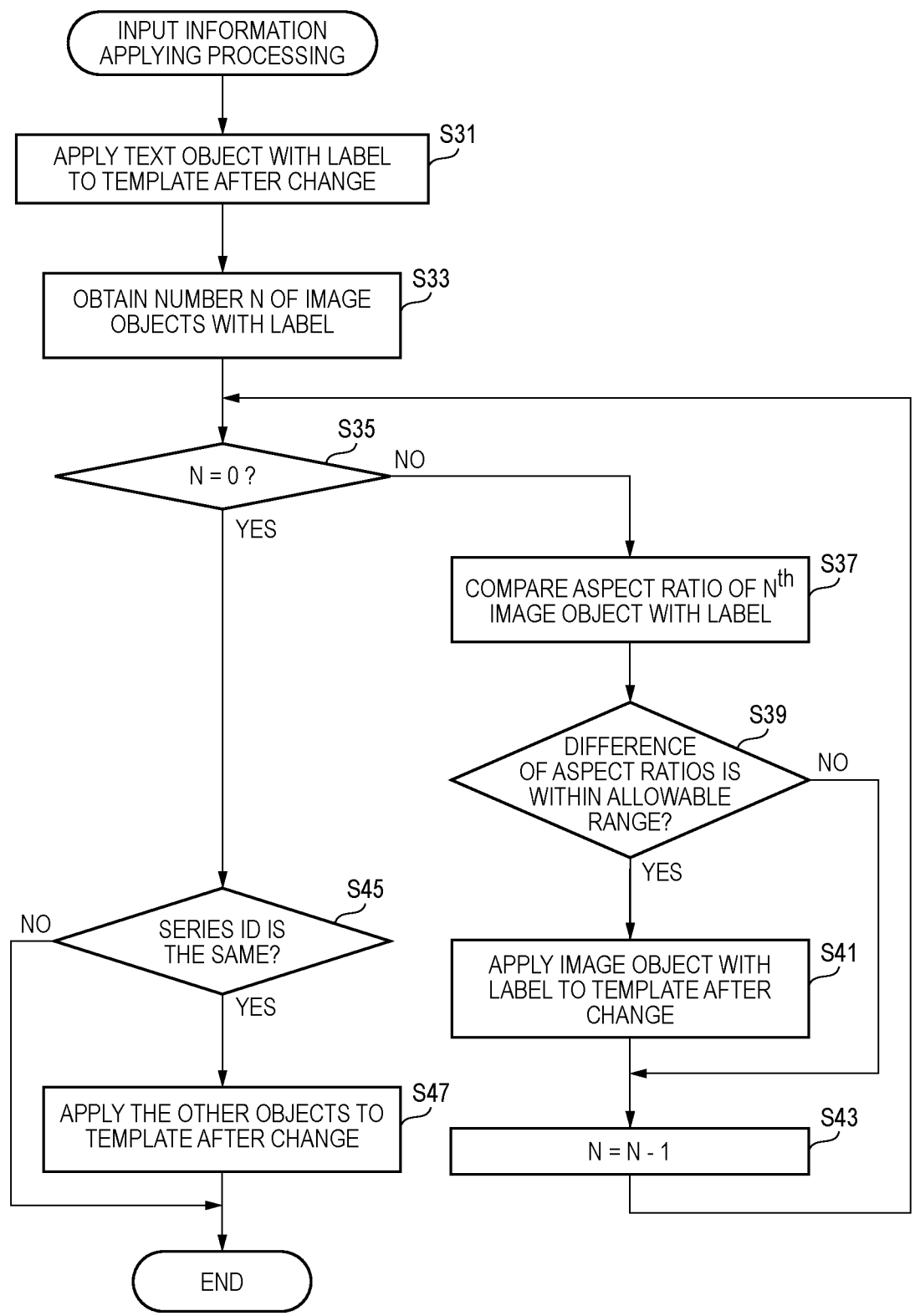
FIG. 10 is a flowchart of input information applying processing in accordance with the second illustrative embodiment.

Subsequently, processing contents of the input information applying processing are described with reference to FIG. 10. Here, a case where the template before change is the template T1 and the template after change is the template T3 is appropriately exemplified and described.

When the input information applying processing starts, the business card preparation program 65 applies a text object with label of the input information table 68 to the template after change (S31). Here, the text object with label indicates the object O of which a value of "label" is not empty and "type" is a text. Specifically, the business card preparation program 65 stores the input data of the text object with label in the RAM of the memory 63 in association with the template after change obtained in step S11 or step S25. Specifically, the business card preparation program 65 associates the input data with the object O of the template after change, which has the value coinciding with the value of "label" of the input data. As shown in FIGS. 2A and 2B, the text objects with label of the template T3, of which the value of "label" is common to the template T1, are the objects O23 to O26. Therefore, in step S31, the input data of the objects O13 to O16 is associated with the objects O23 to O26.

Returning to FIG. 10, the business card preparation program 65 obtains the number of image objects with label, sets a variable N to the obtained number of image objects with label, and gives a number to the image object with label (S33). Here, the image object with label indicates an object O of which a value of "label" is not empty and "type" is an image. Meanwhile, in the below, the text object with label and the image object with label may also be collectively referred to as the object with label. As shown in FIG. 2A, since the image object with label of the template T1 is two, i.e., the objects O11, O12, the variable N is set to two. Then, the business card preparation program 65 determines whether the variable N is zero (0) (S35, FIG. 10), When it is determined that the variable N is not zero (0) (S35: NO), the business card preparation program 65 compares an aspect ratio of the area size of the input data of the $N^{th}$ object with label and an aspect ratio of the object with label of the template after change having the same value of "label" (S37). Specifically, the business card preparation program 65 calculates a difference of the aspect ratios by subtracting the calculated aspect ratio of the object with label of the template after change from the calculated aspect ratio of the area size of input data, based on the value of "size". The aspect ratio is a value calculated by dividing a vertical size of an area size by a horizontal size or a value calculated by dividing a horizontal size of an area size by a vertical size. Then, the business card preparation program 65 determines whether the calculated difference of the aspect ratios is within an allowable range (S39). The allowable range is a range indicated by a numerical value stored in advance in the memory 63, for example. Then, when it is determined that the difference of the aspect ratios is within the allowable range (S35: YES), the business card preparation program 65 applies the input data of the image object with label to the template after change (S41), like step S31, and proceeds to step S43. On the other hand, when it is determined that the difference of the aspect ratios is not within the allowable range (S35: NO), the business card preparation program 65 skips over step S41, and proceeds to step S43. Then, the business card preparation program 65 updates the variable N to a value obtained by subtracting 1 from the variable N (S43), and returns to step S35. In this way, the business card preparation program 65 executes the processing of step S37 and thereafter for all the image objects with label.

As shown in FIG. 2B, the image objects with label of the template T3, of which the value of "label" is common to the template T1, are the objects O21 and O22. Since the object O22 has the same value of "size" as the object O12, a result of determination in step S39 is YES, and the input data is stored in the RAM of the memory 63 in association with the object O22, in step S41. On the other hand, the object O21 has a different value of "size" from the object O11. Also, here, it is assumed that the values of "size" are different to the extent that a result of determination in step S39 is NO. In this case, the input data is not stored in the RAM of the memory 63 in association with the object O21.

When it is determined that the variable N is zero (0) (S35: YES), the business card preparation program 65 determines whether the value of "series ID" of the template after change is the same as the value of "series ID" of the template before change (S45). When it is determined that the values of "series ID" are the same (S45: YES), the business card preparation program 65 applies objects with no label, which are the other objects, to the template after change (S47), like step S31, and ends the input information applying processing. Here, the object with no label is an object O of which the value of "label" is empty. On the other hand, when it is determined that the values of "series ID" are not the same (S45: NO), the business card preparation program 65 skips over step S47, and ends the input information applying processing.

After the input information applying processing is executed and the change processing is over, the business card preparation program 65 displays the editing screen DS2, which includes the image of the template after change associated with the input data stored in the RAM of the memory 63, on the display 52. Specifically, the business card preparation program 65 displays, on the display 52, the editing screen in which each object O of the template after change is displayed at a position of the template image TI1 corresponding to the arrangement position indicated by the value of "arrangement coordinate", at which the input data stored in the memory 63 in association with each object O is reflected in accordance with the attributes of each object O of the template after change.

Figure 11:
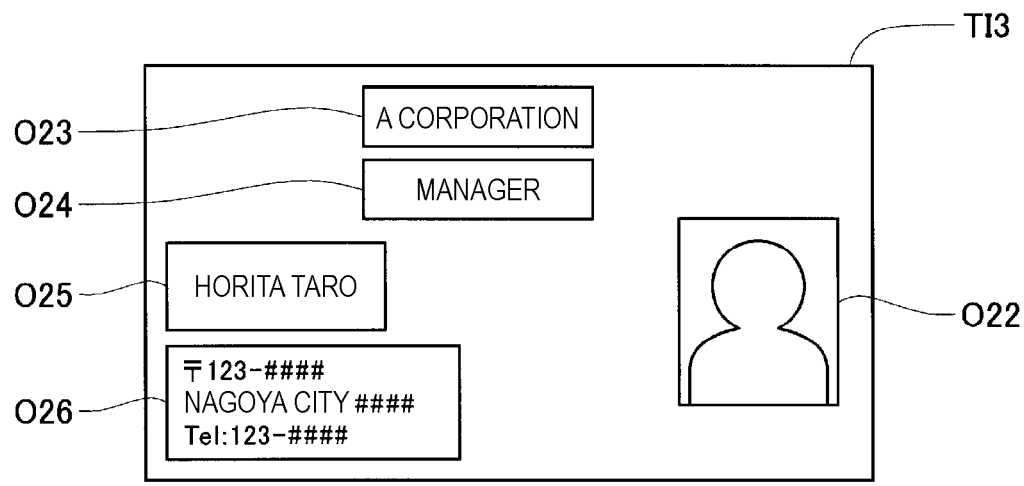
FIG. 11 depicts an image of the template after change in accordance with the second illustrative embodiment.

When the template before change is the template T1 and the template after change is the template T3, the template image TI3 is as shown in FIG. 11. The object O22, of which the difference of the aspect ratios is within the allowable range, of the image objects with label is arranged in the template image TI3, and the object O21 of which the difference of the aspect ratios is not within the allowable range is not arranged in the template image TI3. The objects O23 to O26, which are the text objects with label, are arranged in the template image TI3. The objects with no label O17 and O18 are not arranged in the template image TI3.

Figure 12:
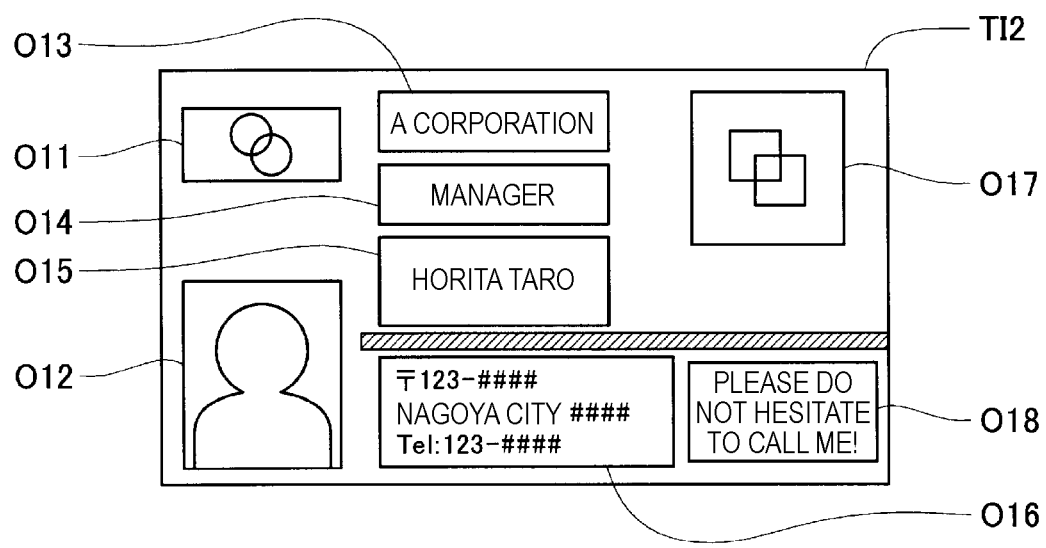
FIG. 12 depicts an image of the template after change in accordance with the second illustrative embodiment, which is different from FIG. 11.

Also, when the template before change is the template T1 and the template after change is the template T2, the template image TI2 is as shown in FIG. 12. Since the value of "series ID" of the template T2 is the same as the value of "series ID" of the template T1, all the objects O in the input information table 68 are arranged in the template image TI2.

Here, the value of "size", which is an attribute, is an example of the size information, and the value of "series ID" is an example of the group information. Also, the processing of step S45 is an example of the comparison processing. Also, the input data of the object with label is an example of the first input data, and the input data of the object with no label is an example of the second input data.

According to the second illustrative embodiment, following effects are accomplished.

For the input data of the object O, which is determined as YES in step S39 and includes the value of "label" common between the template before change and the template after change and of which the difference of the aspect ratios based on the values of "size" is within the allowable range, even though the input data is the input data of the object O of which "type" is an image, the business card preparation program 65 stores the input data in the memory 63 in association with the object O of the template after change of which the value of "label" is the same. There is a high possibility that the image object with label of which the difference of the aspect ratios is within the predetermined range will maintain the display state in the template before change. Since only the input data of the image object with label of which the difference of the aspect ratios is within the predetermined range is taken over by the template after change, the input data can be appropriately taken over.

Also, when it is determined that the value of "series ID" of the template before change is the same as the value of "series ID" of the template after change (S45: YES), the business card preparation program 65 reflects even the object with no label to the template after change. The description "the values of "series ID" are the same" indicates that the values of attribute of the objects O to be included are the same. That is, the templates T of which the values of "series ID" are the same indicate that the arrangement positions of the objects O to be included are the same. In the case of the templates T of which the values of "series ID" are the same, a possibility that the object with no label will interfere with the object O of the template after change is low. In the case of the object with no label, only when the values of "series ID" are the same, since the input data thereof is taken over by the template after change, the input data can be appropriately taken over.

In the meantime, the present disclosure is not limited to the above illustrative embodiments, and a variety of improvements and changes can be made without departing from the gist of the present disclosure.

For example, in the input information applying processing in accordance with the second illustrative embodiment, the processing of steps S45 and S47 is executed. However, the processing of steps S45 and S47 may not be executed. That is, the business card preparation program 65 may execute the input information applying processing in which the input data of the object with no label is not stored in association with the template after change. The object with no label may interfere with the object O of the template after change. The input data of the object with no label is not taken over, so that the input data can be appropriately taken over.

Also, in the input information applying processing in accordance with the second illustrative embodiment, instead of the processing of comparing the values of "series ID" in step S45, the values of "arrangement coordinate" of all the objects O of the template before change and the values of "arrangement coordinate" of all the objects O of the template after change, which have the same value of "label", may be compared, and when the value of "arrangement coordinate" is the same for all the objects, the processing of step S47 may be executed. When the value of "arrangement coordinate" is the same, the possibility that even the object with no label will interfere with the object O of the template after change is low. In the case of the object with no label, only when the value of "arrangement coordinate" is the same, since the input data thereof is taken over by the template after change, the input data can be appropriately taken over. In the meantime, like the second illustrative embodiment, in the templates Tin which the value of "arrangement coordinate" of the objects O to be included is common, when the same value of "series ID" is given in advance, it is possible to effectively determine whether the values of "arrangement coordinate" of all the objects O of the template before change and the values of "arrangement coordinate" of all the objects O of the template after change are the same.

Also, in the input information applying processing in accordance with the second illustrative embodiment, the processing of steps S45 and S47 may be executed before the processing of step S31, and when a result of determination in step S45 is YES, all the objects O may be applied to the template after change. When a result of determination in step S45 is NO, the respective processing of steps S31 to S43 may be executed.

Also, the contents to be stored in the input information table of the first illustrative embodiment may be the same as the contents of the input information table described in the second illustrative embodiment. In the input information applying processing, like step S45, it may be determined whether the values of the series ID are the same, and when a result of determination is YES, all the objects O may be applied to the template after change, and when a result of determination is NO, the text object with label may be applied to the template after change.

Also, in the above illustrative embodiments, as an example of the object of which the difference of the aspect ratios is equal to or less than the predetermined value, the object of which the difference of the aspect ratios is within the allowable range (S39: YES) has been described. The processing of determining whether the difference of the aspect ratios is equal to or less than the predetermined value is not limited to the above example. For example, an absolute value of the difference of the aspect ratios may be compared with a predetermined value. Also, in step S37, the aspect ratio is calculated on the basis of the value of "size". However, "aspect ratio" may be included in the attributes of the object O, and values of "aspect ratio" may be compared. Also, in step S37, the aspect ratio of the area size of the input data of the $N^{th}$ object with label and the aspect ratio of the object with label the template after change having the same value of "label" are compared. However, the present disclosure is not limited thereto. For example, instead of the input data, the aspect ratio of the area size of the $N^{th}$ object with label may be compared.

Also, in the above illustrative embodiments, in the case where the result of the determination in step S13 is YES, when the selection operation on the selection button "Yes" of the selection buttons "Yes" and "No", which are displayed on the display 52 together with the message "Do you want the previous information to be reflected?", is received through the user I/F 53, the business card preparation program 65 displays, on the display 52, the editing screen in which the input data stored in the memory 63 is reflected, and when the selection operation on the selection button "No" is received through the user I/F 53, the business card preparation program 65 displays, on the display 52, the editing screen in which the input data is not reflected even though the input data is stored in the memory 63. However, the present disclosure is not limited thereto. For example, when the selection button "Yes" is not selected within a predetermined time period after the selection buttons "Yes" and "No" are displayed on the display 52 together with the message "Do you want the previous information to be reflected?", the business card preparation program 65 may display, on the display 52, the editing screen in which the input data is not reflected even though the input data is stored in the memory 63. Also, in the first illustrative embodiment, when displaying the message "Do you want the previous information to be reflected?" on the display 52, information indicated by "label" and "character" of each object may be displayed together with the message. By seeing the displayed message, the user can know what kind of character string is to be reflected in which area, before the editing screen is displayed.

Also, in the above illustrative embodiments, the user's selection operation on the touch panel 51 has been described as "tap". However, the present disclosure does not limit the operation. Although the input medium is not in contact with the display surface, "hover" or "floating touch" of bringing the input medium close to a position at which a distance between the input medium and the display surface is very small may be included in the concept of the "touch." Also, the input medium may be a user's finger, a touch pen or the like.

Also, in the above illustrative embodiments, the business card preparation program 65 is stored in the memory 63 of the portable device 50. However, the present disclosure is not limited thereto. For example, the business card preparation program 65 may be stored in a server that can be connected to the portable device 50 via the communication network. Also, when the business card preparation program 65 is stored in the server, it may be transmitted to the portable device 50 through the communication network such as the internet, as information or signal indicative of the business card preparation program 65. Also, although the business card preparation program 65 for preparing a business card has been described, the present disclosure is not limited to the business card and may be any editing program configured to use templates capable of inputting an image and a text as an object, such as a face of a postcard.

What is claimed is:

1. A non-transitory computer-readable medium storing a computer program readable by a computer comprising a display, an interface and a memory,
    the memory storing a plurality of templates, the plurality of templates comprising attribute information of objects to be arranged in each of the plurality of templates, the attribute information comprising:
        identification information identifying the objects;
        arrangement information indicating arrangement positions of the objects; and
        type information indicating types of the objects, the type information comprising information indicating a type of an object,
    the computer program, when executed by the computer, causing the computer to perform:
        displaying, on the display, a first editing screen corresponding to a first template of the plurality of templates stored in the memory;
        receiving input data via the interface;
        in response to receiving the input data while the first editing screen is displayed on the display, storing the received input data in the memory as input data of the object included in the first template;
        updating the first editing screen to reflect the received input data at a first position, the first position corresponding to an arrangement position indicated by the arrangement information of the object included in the first template;
        receiving an instruction to display a second editing screen corresponding to a second template via the interface while the first editing screen is displayed on the display, the second template being different from the first template;

determining whether the type of the received input data is a first type or a second type, the first type being text, and the second type being an image; and displaying, on the display, in response to receiving the instruction, the second editing screen reflecting the received input data in a case that the received input data is determined to be the text stored in the memory and not reflecting the received input data in a case that the received input data is determined to be the image stored in the memory, the received input data, determined to be the text, being reflected on the second editing screen at a second position as input data of the object included in the second template having identification information same as the identification information of the object, the second position corresponding to an arrangement position indicated by the arrangement information of the object of the second template, and the received input data, determined to be the image, not being reflected on the second editing screen as the input data of the object included in the second template having identification information same as the identification information of the object.

2. The non-transitory computer-readable medium according to claim 1, wherein the attribute information comprises size information indicating sizes of the objects, and wherein the displaying of the second editing screen is performed by:

in a case where a difference of aspect ratios based on sizes indicated by the size information of the object is equal to or less than a predetermined value, displaying, on the display, the second editing screen reflecting the received input data of the image as the input data of the object included in the second template having identification information same as the identification information of the object; and in a case where a difference of aspect ratios based on sizes indicated by the size information of the object is not equal to and less than a predetermined value, displaying, on the display, the second editing screen without reflecting the received input data of the image as the input data of the object included in the second template having identification information same as the identification information of the object.

3. The non-transitory computer-readable medium according to claim 1, wherein the input data to be received when performing the receiving comprises:

first input data associated with the object to be arranged in the first template; and second input data not associated with the object, and wherein the displaying, on the display, the second editing screen reflecting the first input data in the second template and without reflecting the second input data in the second template, in response to receiving the instruction.

4. The non-transitory computer-readable medium according to claim 3, wherein in a case where the arrangement positions indicated by the arrangement information in the first template coincide with the arrangement positions indicated by the arrangement information in the second template, the displaying, on the display, the second editing screen reflecting the second input data in the second template at a position same as the first position.

5. The non-transitory computer-readable medium according to claim 4, wherein the plurality of templates is respectively associated with group information for specifying a group each template belongs to, the group information associated with the templates having common attribute information being the same, and wherein in a case where the group information associated with the first template and the group information associated with the second template are the same, it is determined that the arrangement positions indicated by the arrangement information coincide with each other.

6. The non-transitory computer-readable medium according to claim 1, wherein in a case where input data is stored in the memory when activating the computer program, the computer program causes the computer to perform:

displaying, on the display, a third editing screen reflecting the stored input data as input data of the object of the template displayed.

7. The non-transitory computer-readable medium according to claim 6, wherein the displaying is performed by:

in a case where a predetermined input is received via the interface, displaying, on the display, the third editing screen reflecting input data stored in the memory as the input data of the object of the template displayed; and in a case where the predetermined input is not received, displaying, on the display, the third editing screen without reflecting the stored input data.

8. A data processing device comprising:

a display;

an interface;

a memory storing an application program and a plurality of templates, the plurality of templates comprising attribute information of objects to be arranged in each of the plurality of templates, the attribute information comprising:

identification information identifying the objects;

arrangement information indicating arrangement positions of the objects; and type information indicating types of the objects, the type information comprising information indicating a type of an object; and a controller performed by the application program and configured to:

display, on the display, a first editing screen corresponding to a first template of the plurality of templates stored in the memory;

receive input data via the interface;

in response to receiving the input data while the first editing screen is displayed on the display, store the received input data in the memory as input data of the object included in the first template;

update the first editing screen to reflect the received input data at a first position, the first position corresponding to an arrangement position indicated by the arrangement information of the object included in the first template;

receive an instruction to display a second editing screen corresponding to a second template via the interface while the first editing screen is displayed on the display, the second template being different from the first template;

determine whether the type of the received input data is a first type or a second type, the first type being text, and the second type being an image; and display, on the display, in response to receiving the instruction, the second editing screen reflecting the received input data in a case that the received input data is determined to be the text stored in the memory and not reflecting the received input data in a case that the received input data is determined to be the image stored in the memory, the received input data, determined to be the text, being reflected on the second editing screen at a second position as input data of the object included in the second template having identification information same as the identification information of the object, the second position corresponding to an arrangement position indicated by the arrangement information of the object of the second template, and the received input data, determined to be the image, not being reflected on the second editing screen as the input data of the object included in the second template having identification information same as the identification information of the object.

9. The data processing device according to claim 8, wherein the attribute information comprises size information indicating sizes of the objects, and wherein the displaying of the second editing screen is performed by:

in a case a difference of aspect ratios based on sizes indicated by the size information of the object is equal to or less than a predetermined value, displaying, on the display, the second editing screen reflecting the received input data of the image as the input data of the object included in the second template having identification information same as the identification information of the object; and in a case a difference of aspect ratios based on sizes indicated by the size information of the object is not equal to and less than a predetermined value, displaying, on the display, the second editing screen without reflecting the received input data of the image as the input data of the object included in the second template having identification information same as the identification information of the object.

10. The data processing device according to claim 8, wherein the input data to be received when performing the receiving comprises:

first input data associated with the object to be arranged in the first template; and second input data not associated with the object, and wherein the displaying, on the display, the second editing screen reflecting the first input data in the second template and without reflecting the second input data in the second template, in response to receiving the instruction.

11. The data processing device according to claim 10, wherein in a case where the arrangement positions indicated by the arrangement information in the first template coincide with the arrangement positions indicated by the arrangement information in the second template, the displaying, on the display, the second editing screen reflecting the second input data in the second template at a position same as the first position.

12. The data processing device according to claim 11, wherein the plurality of templates is respectively associated with group information for specifying a group each template belongs to, the group information associated with the templates having common attribute information being the same, and wherein in a case where the group information associated with the first template and the group information associated with the second template are the same, it is determined that the arrangement positions indicated by the arrangement information coincide with each other.

13. The data processing device according to claim 8, wherein in a case where input data is stored in the memory when activating the application program, the controller is configured to:

display, on the display, a third editing screen reflecting the stored input data as input data of the object of the template displayed.

14. The data processing device according to claim 13, wherein the displaying is performed by:

in a case where a predetermined input is received via the interface, displaying, on the display, the third editing screen reflecting input data stored in the memory as the input data of the object of the template displayed; and in a case where the predetermined input is not received, displaying, on the display, the third editing screen without reflecting the stored input data.

15. A data processing method of a computer comprising a display, an interface and a memory, the memory storing a plurality of templates, the plurality of templates comprising attribute information of objects to be arranged in each of the plurality of templates, the attribute information comprising:

identification information identifying the objects;

arrangement information indicating arrangement positions of the objects; and type information indicating types of the objects, the type information comprising information indicating a type of an object, the data processing method comprising causing the computer to perform:

displaying, on the display, a first editing screen corresponding to a first template of the plurality of templates stored in the memory;

receiving input data via the interface;

in response to receiving the input data while the first editing screen is displayed on the display, storing the received input data in the memory as input data of the object included in the first template;

updating the first editing screen to reflect the received input data at a first position, the first position corresponding to an arrangement position indicated by the arrangement information of the object included in the first template;

receiving an instruction to display a second editing screen corresponding to a second template via the interface while the first editing screen is displayed on the display, the second template being different from the first template;

determining whether the type of the received input data is a first type or a second type, the first type being text, and the second type being an image; and displaying, on the display, in response to receiving the instruction, the second editing screen reflecting the received input data in a case that the received input data is determined to be the text stored in the memory and not reflecting the received input data in a case that the received input data is determined to be the image stored in the memory, the received input data, determined to be the text, being reflected on the second editing screen at a second position as input data of the object included in the second template having identification information same as the identification information of the object, the second position corresponding to an arrangement position indicated by the arrangement information of the object of the second template, and the received input data, determined to be the image, not being reflected on the second editing screen as the input data of the object included in the second template having identification information same as the identification information of the object.

* * * * *